United States Patent
Eldridge

(10) Patent No.: US 8,025,258 B2
(45) Date of Patent: Sep. 27, 2011

(54) ELECTRICAL WIRE BRACKET DEVICE

(76) Inventor: Richard Eldridge, Marietta, GA (US)

( * ) Notice: Subject to any disclaimer, the term of this patent is extended or adjusted under 35 U.S.C. 154(b) by 0 days.

(21) Appl. No.: 11/940,681

(22) Filed: Nov. 15, 2007

(65) Prior Publication Data

US 2008/0111033 A1 May 15, 2008

(51) Int. Cl.
*F16L 3/08* (2006.01)
(52) U.S. Cl. ......... 248/65; 248/68.1; 248/74.3; 174/135
(58) Field of Classification Search .............. 248/58, 248/65, 68.1, 304, 305, 59, 62, 339, 74.5, 248/49, 74.3, 69, 63; 174/135, 68.1
See application file for complete search history.

(56) References Cited

U.S. PATENT DOCUMENTS

| | | | | |
|---|---|---|---|---|
| 1,365,626 A | * | 1/1921 | Pleister et al. | 248/69 |
| 1,547,220 A | * | 7/1925 | Kipp | 174/136 |
| 2,310,434 A | * | 2/1943 | Hyman | 248/71 |
| 2,397,291 A | * | 3/1946 | Robertson | 248/68.1 |
| 3,227,406 A | * | 1/1966 | Shelton et al. | 248/74.4 |
| 3,363,864 A | * | 1/1968 | Olgreen | 248/68.1 |
| 4,790,574 A | * | 12/1988 | Wagner et al. | 285/419 |
| 4,960,253 A | * | 10/1990 | Perrault et al. | 248/68.1 |
| 5,016,843 A | * | 5/1991 | Ward | 248/68.1 |
| 5,149,027 A | * | 9/1992 | Weber | 248/68.1 |
| 5,240,209 A | * | 8/1993 | Kutsch | 248/49 |
| 5,297,890 A | * | 3/1994 | Commins | 403/398 |
| 5,385,320 A | * | 1/1995 | Ismert et al. | 248/62 |
| 5,389,082 A | * | 2/1995 | Baugues et al. | 604/174 |
| 5,393,020 A | * | 2/1995 | Perrault et al. | 248/68.1 |
| 5,399,814 A | * | 3/1995 | Staber et al. | 174/135 |
| 5,918,837 A | * | 7/1999 | Vicain | 248/49 |
| 5,939,680 A | * | 8/1999 | Gretz et al. | 174/135 |
| 5,961,081 A | * | 10/1999 | Rinderer | 248/68.1 |
| 5,988,570 A | * | 11/1999 | Gretz | 248/74.2 |
| 6,170,784 B1 | * | 1/2001 | MacDonald et al. | 248/65 |
| D438,093 S | * | 2/2001 | Mandujano | D8/396 |
| 6,186,452 B1 | * | 2/2001 | Zearbaugh et al. | 248/74.4 |
| 6,446,914 B1 | * | 9/2002 | Laberis | 248/49 |
| 7,341,245 B2 | * | 3/2008 | Joseph | 267/141 |
| 7,352,947 B2 | * | 4/2008 | Phung et al. | 385/135 |
| 7,407,138 B1 | * | 8/2008 | Gretz | 248/58 |
| 7,722,001 B2 | * | 5/2010 | Trotter et al. | 248/65 |
| 2007/0120022 A1 | * | 5/2007 | Trotter et al. | 248/49 |

* cited by examiner

*Primary Examiner* — Kimberly Wood
(74) *Attorney, Agent, or Firm* — Gardner Groff Greenwald & Villanueva

(57) ABSTRACT

An electrical wire bracket including a body having an open loop and at least one mounting foot coupled to the body. The bracket also includes at least one hole through the at least one mounting foot for securing the bracket to a mounting surface. A user can pull electrical wire through the open loop of the body and then allow the body to support the electrical wire.

16 Claims, 3 Drawing Sheets

ELECTRICAL WIRE BRACKET DEVICE

TECHNICAL FIELD

The present invention relates generally to the field of electrical wires and more particularly, to a bracket for holding electrical wires.

BACKGROUND OF THE INVENTION

Typically, when installing various types of electrical cables into commercial and/or residential buildings, the cables are placed within the infrastructure of the building, such that the cables are largely hidden from view. In multistoried buildings, the cables are often placed between the floor and ceiling of two adjoining stories of the building. Generally, to support and guide the cables, wire brackets are used, such as a known bracket 10 shown in FIG. 1. Typically, these known brackets 10 are formed from steel and often have mounting holes to secure the bracket to the infrastructure of the building. There are several drawbacks to the known wire brackets 10 including: (1) the steel composition is very heavy and expensive to produce, and (2) it is both difficult and requires a significant amount of time for an installer to secure cables to the brackets.

Thus, it can be seen that needs exist for improvements to wire brackets that allow a cable installer to quickly and easily secure wires to a wire bracket. Additionally, it can be seen that needs exist for wire brackets that use alternative materials to reduce the weight and cost of the same. It is to the provision of these needs and others that the present invention is primarily directed to.

SUMMARY OF THE INVENTION

In example forms, the present invention relates to an electrical wire bracket that solves the problems mentioned above. In order to reduce the time it takes for a cable installer to secure cable to a support bracket and to increase the efficiency and ability for an installer to do the same, example embodiments of the present invention include one or more cutouts in the body of the bracket to receive a fastener therethrough for securing the cable to the bracket. Additionally, the bracket can be made from a variety of non-metallic materials to reduce the weight and cost of the same.

In one aspect, the present invention relates to an electrical wire bracket including a body defining an open loop and at least one mounting foot coupled to the body. The bracket also includes at least one hole through the at least one mounting foot for securing the bracket to a mounting surface. A user can pull electrical wire through the open loop of the body and then allow the body to support the electrical wire. Optionally, the body has cutouts for receiving fasteners therein, and wherein the fasteners can be used to secure electrical wire to the bracket.

In another aspect, the present invention relates to a method of installing cable. The method includes first mounting a wire bracket to a mounting surface, wherein the wire bracket has a U-shaped body defining an open loop and has at least one cutout therein, and wherein the cutout is adapted to receive at least one fastener therethrough. Electrical wire can then be placed within the open loop. Optionally, the cable can be secured to the bracket by utilizing the cutout in the body to receive a fastener. Still optionally, the cable can be service entrance cable, non-metallic cable, metallic cable, and/or low voltage cable.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
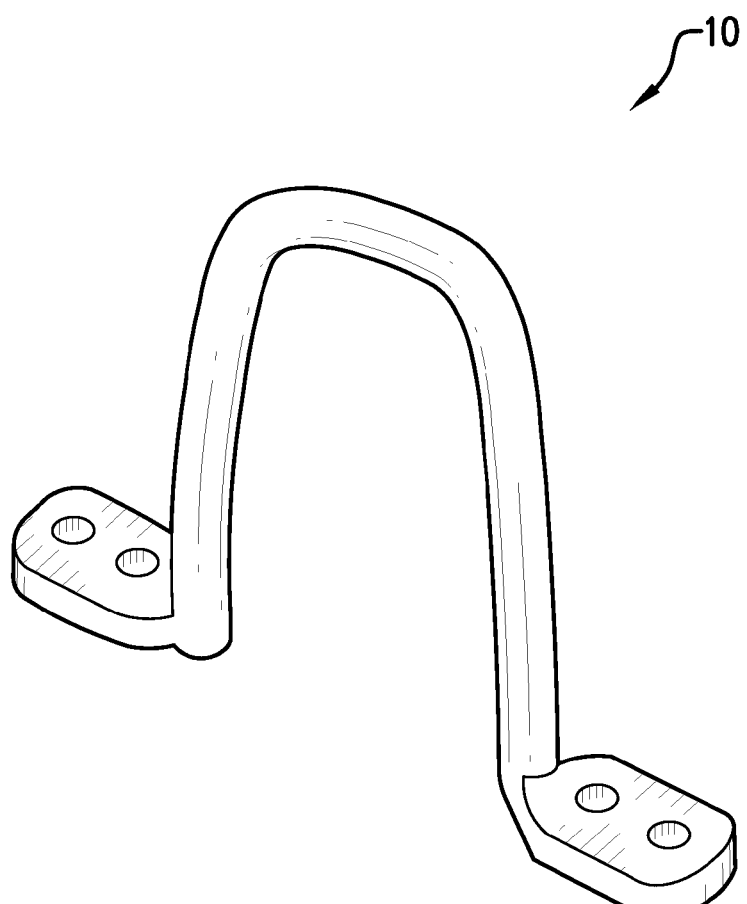
FIG. 1 is a perspective view of a prior art electrical wire bracket.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, FIGS. 2-6 depict an electrical wire bracket device 110 according to an example embodiment of the present invention. The wire bracket 110 is generally comprised of a body 120, at least one, and preferably two, mounting feet 130, and at least one mounting hole 140. The electrical wire bracket 110 is preferably formed from ultra high molecular weight polyethylene, although in alternate embodiments, the wire bracket is formed from aluminum, steel, steel alloys, other metals, polypropylene, glass reinforced nylon, other plastics, rubber, etc. The wire bracket 110 can be manufactured through injection molding, blow molding, a roll-forming process, die cast, or other methods of making the same.

Figure 3:
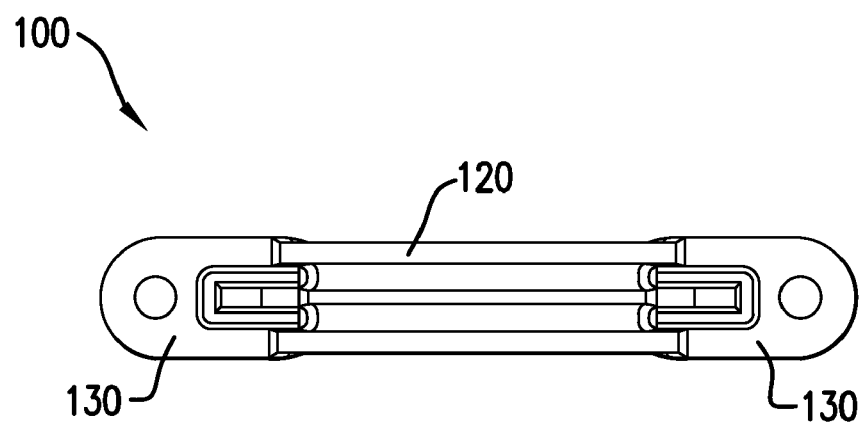
FIG. 3 is a top view of the electrical bracket of FIG. 2.
Figure 4:
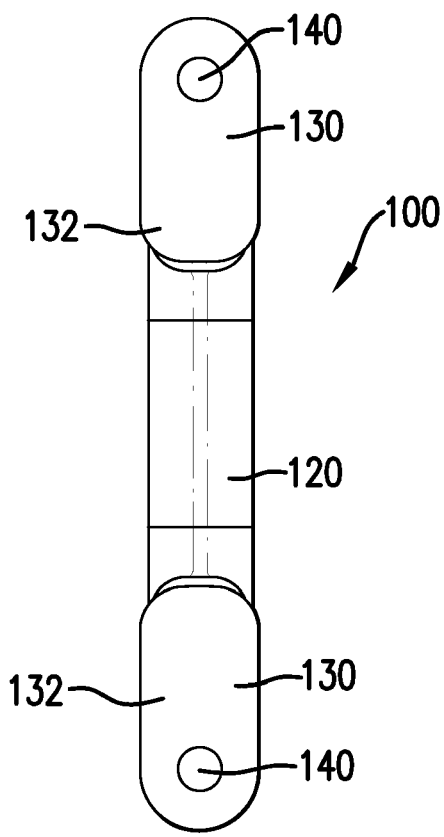
FIG. 4 is a bottom view of the electrical wire bracket of FIG. 2.
Figure 5:
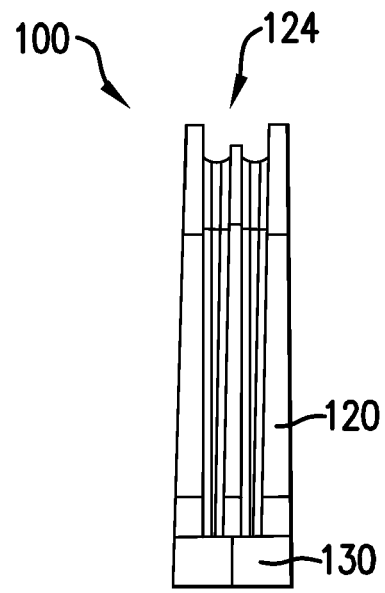
FIG. 5 is a side view of the electrical wire bracket of FIG. 2.

As shown in FIG. 3, an example embodiment of the wire bracket 110 includes one hole 140 through each of the mounting feet 130 for receiving a conventional fastener therethrough to secure the bracket to a particular mounting surface. The bracket 110 can be secured to a wall, floor, studs, ceiling, etc. through the use of various known fasteners including screws, concrete anchors, bolts and/or any other conventional fastener. In preferred embodiments, the bases 132 of the mounting feet 130, as see in FIG. 4, are flat to enable the bracket 110 to be placed flat against the mounting surface. Known brackets 10, as shown in FIG. 1, utilize four (4) holes through the mounting feet to secure the bracket to a surface. Since preferred embodiments of the present invention only include two (2) mounting holes 140, less drilling is required, which helps maintain the building's structural integrity and saves an installer's time when installing the bracket 110.

Figure 2:
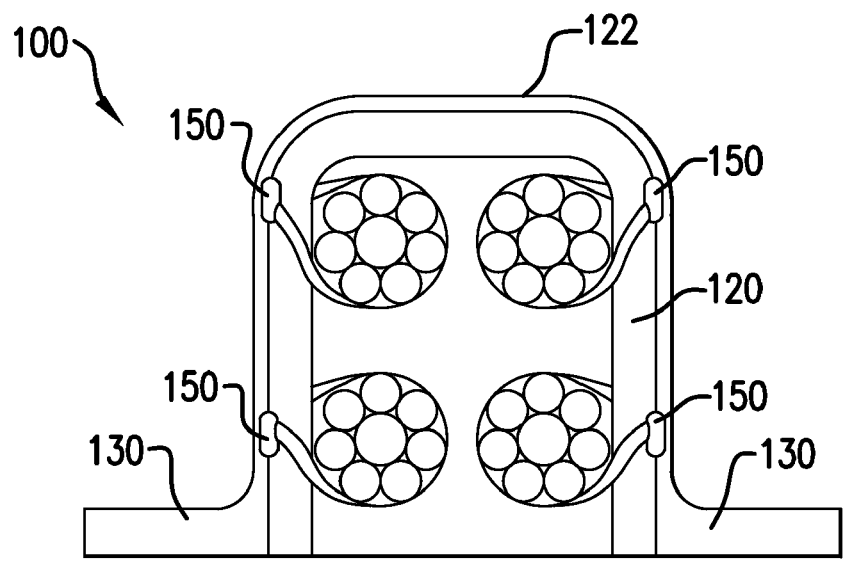
FIG. 2 is a front view of an electrical wire bracket according to an example embodiment of the present invention.

As best seen in FIG. 2, it is preferred that the body 120 of the bracket 110 have a "U" shape, or "D" shape, defining an open loop therein. Alternatively, the body can be circular, elliptical, rectangular, etc. In preferred embodiments, the surface 122 of the body 120 is smooth to allow a user to pull electrical wires across the surface without damaging the wires. In fact, the bracket 110 is specially designed to receive various industrial and residential electrical cables, including: service entrance cables, non-metallic cable, metallic cable, and low voltage cable, whereas known brackets 10 are only capable of being used only with low voltage cable. In example embodiments, the bracket 110 can have various sizes such as, 3.5 inches high by 3.5 inches wide, 2.5 inches by 2.5 inches, and 1.5 inches by 2.5 inches, although other sizes can be used to meet the needs of a particular application and nothing herein is intended to limit the present invention to a particular size. The thickness of the body 120 can also vary, although in example embodiments the thickness is between about 0.1 inch and about 1 inch in diameter. Additionally, in example embodiments, the body 120 includes a structural support rib 124 for adding additional strength to the bracket 110, while minimizing the amount of material needed to construct the bracket and material costs.

Figure 6:
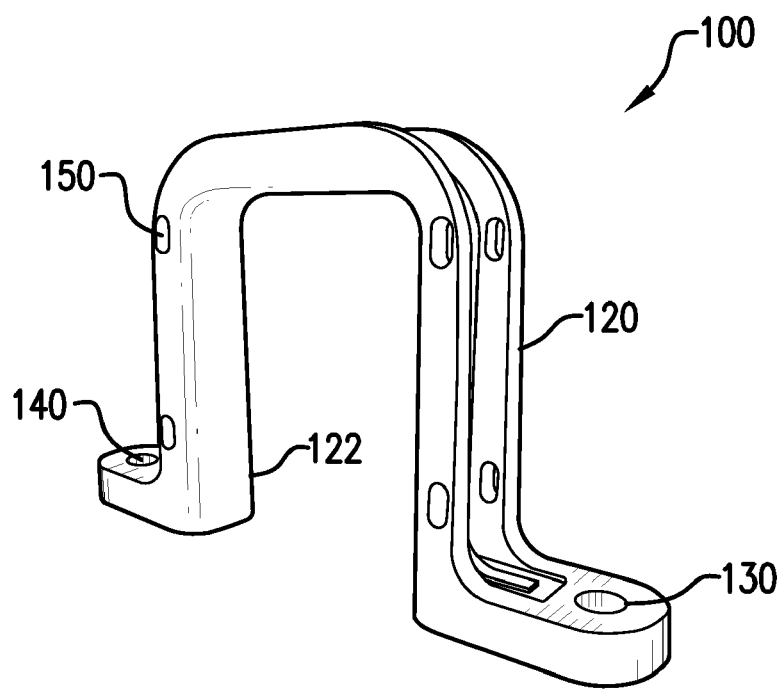
FIG. 6 is a perspective view of the electrical wire bracket of FIG. 2.

In operation, a user can mount the bracket 110 to a surface that is intended to support the electrical wires. A user can then thread the electrical wire(s) through the U-shaped opening of the bracket 110 and rest the wire(s) against the body 120 of the bracket to support the same. A user may install numerous brackets 110 for any given installation depending on the length of the wire "run", or the distance the wire must travel. The required number of brackets 110 to complete each installation varies with the length, thickness, and the weight of the wire. In preferred embodiments, the bracket 110 includes one or more tie cutouts 150 for receiving a wire tie, cable tie, zip tie, hook and loop fastener, rubber band, string, or other flexible fastener therethrough for securing the wires to the bracket, as seen in FIGS. 2 & 6. While four (4) cutouts 150 are shown in the drawing figures, one, two, three, four, or more cutouts can be used depending on the particular needs of the user. This feature is a great improvement over known electrical wire brackets as a user is able to reliably fasten and secure an electrical wire, or group of wires, to a particular bracket 110. Often, it has been found that it is both economical and quicker to use one bracket 110 to receive several different groups of wires. The cutouts 150 (in conjunction with a wire tie or other fastener) help keep each group of wires separate, while still being supported by one bracket 110.

While the invention has been described with reference to preferred and example embodiments, it will be understood by those skilled in the art that a variety of modifications, additions and deletions are within the scope of the invention, as defined by the following claims.

What is claimed is:

1. An electrical wire bracket for supporting a plurality of bundles of electrical wires, comprising:
   a generally U-shaped body having an open end and a closed end;
   a recessed channel extending substantially throughout the length of the U-shaped body, the recessed channel having a support rib protruding from the base of the channel, and the support rib extending substantially throughout the length of the channel, such that the U-shaped body has an E-shaped cross-section;
   at least two mounting feet extending from the U-shaped body adjacent the open end, the at least two mounting feet including substantially flat mounting surfaces;
   at least one hole through each of the at least two mounting feet for receiving first and second bracket-mounting fasteners therethrough, the first and second bracket-mounting fasteners used to mount the bracket to a mounting surface; and
   a plurality of cutouts extending through the U-shaped body for receiving a plurality of wire-securing fasteners therethrough, the wire-securing fasteners used to secure the bundles of electrical wires to the body;
   wherein the U-shaped body and the mounting feet extend along a first plane and the mounting surface extends along a second plane, the second plane being substantially perpendicular to the first plane, and
   wherein the generally U-shaped body includes a closed-end segment forming its closed end and two opposing side segments each extending between the closed-end segment and a respective one of the two mounting feet,
   wherein at least a first one of the cutouts is formed in one of the side segments adjacent the respective mounting foot, at least a second one of the cutouts is formed in the body adjacent where one of the side segments extends from the closed-end segment, and the first and second cutouts are spaced apart, such that a first one of the bundles of electrical wires can be secured to one of the side segments adjacent the respective mounting foot by a first one of the wire-securing fasteners extending through the first cutout, and a second one of the bundles of electrical wires can be secured to the body adjacent where one of the side segments extends from the closed-end segment by a second one of the wire-securing fasteners extending through the second cutout, with the first and second bundles of wires separate from, and thus not touching, each other, and with at least the second bundle of wires resting on the body and thus not compressed against the mounting surface.

2. The electrical wire bracket of claim 1, wherein the composition of the body is formed from the group consisting of: polypropylene, polyethylene, steel, steel alloy, aluminum, aluminum alloy, metal, glass reinforced nylon, plastic, and rubber.

3. The electrical wire bracket of claim 1, wherein the bracket is comprised of polypropylene.

4. The electrical wire bracket of claim 1, wherein the bracket is comprised of polyethylene.

5. The electrical wire bracket of claim 1, wherein the body includes four of the cutouts.

6. A method of installing a plurality of bundles of electrical cables, comprising:
   providing a wire bracket comprising a generally U-shaped body having an open end, a closed end, a closed-end segment forming the closed end, first and second opposing side segments each extending from the closed-end segment toward the open end, a recessed channel extending substantially throughout the length of the U-shaped body, and two spaced-apart parallel sidewalls that define the recessed channel, comprising two mounting feet extending from the first and second side segments of the U-shaped body adjacent the open end, and comprising a plurality of cutouts extending through the U-shaped body, wherein at least a first one of the cutouts is formed in a first one of the side segments adjacent the respective mounting foot, at least a second one of the cutouts is formed in the body adjacent where one of the side segments extends from the closed-end segment, and the first and second cutouts are spaced apart, mounting the wire bracket to a mounting surface with at least one bracket-mounting fastener to create a closed loop;

placing electrical cables through the closed loop;

arranging a first group of the cables in the closed loop into a first bundle and a second group of the cables in the closed loop into a second bundle;

securing the first bundle of cables to the first side segment of the U-shaped body in a position adjacent the respective mounting foot by routing a first wire-securing fastener through the first cutout and around the first bundles of cables, then securing the second bundle of cables to the U-shaped body in a position adjacent where one of the side segments extends from the closed-end segment by routing a second wire-securing fastener through the second cutout and around the second bundles of cables, such that the first and second bundles of cables are separate from, and thus not touching, each other, such that at least the second bundle of wires rests on the body and thus is not compressed against the mounting surface, and such that the first and second bundles of cables extend through the closed loop substantially perpendicular to a plane defined by the U-shaped body.

7. The method of claim 6, further comprising placing the wire-securing fastener through the cutout and around the cable to secure the cable to the bracket.

8. The method of claim 6, wherein the cable is selected from the group consisting of: service entrance cable, non-metallic cable, and metallic cable.

9. The electrical wire bracket of claim 1, wherein the U-shaped body has radiused exposed edges.

10. The electrical wire bracket of claim 1, wherein the plurality of cutouts through the U-shaped body comprises at least one aperture formed in one of the said two spaced-apart parallel sidewalls of the recessed channel.

11. The electrical wire bracket of claim 1, wherein the U-shaped body includes two spaced-apart parallel sidewalls that define the recessed channel, and wherein the plurality of cutouts include two apertures that are defined in the two sidewalls, axially arranged, in alignment with each other, and spaced from the base of the channel such that the wire-security fastener can be routed through the aligned apertures unobstructed by the support rib protruding from the base of the channel.

12. An electrical-wire bracket for supporting a plurality of bundles of electrical wires, comprising:

a generally U-shaped body having an open end, a closed end, a closed-end segment forming the closed end, first and second opposing side segments each extending from the closed-end segment toward the open end, a recessed channel extending substantially throughout the length of the U-shaped body, and two spaced-apart parallel sidewalls that define the recessed channel;

two mounting feet extending from the first and second side segments of the U-shaped body adjacent the open end, the two mounting feet adapted for mounting the bracket to a mounting surface; and a plurality of cutouts extending through the U-shaped body for receiving a plurality of wire-securing fasteners therethrough, the wire-securing fasteners used to secure the plurality of bundles of electrical wires to the body, wherein (a) a first one of the cutouts is formed in the first side segment adjacent the respective mounting foot, (b) a second one of the cutouts is formed in the body adjacent where the first side segment extends from the closed-end segment, (c) a third one of the cutouts is formed in the body adjacent where the second side segment extends from the closed-end segment, and (d) a fourth one of the cutouts is formed in the second side segment adjacent the respective mounting foot, wherein the first, second, third, and fourth cutouts are spaced apart from each other, wherein (a) a first one of the bundles of electrical wires can be secured to the first side segment adjacent the respective mounting foot by a first one of the plurality of wire-securing fasteners extending through the first cutout, (b) a second one of the bundles of electrical wires can be secured to the body adjacent where the first side segment extends from the closed-end segment by a second one of the plurality of wire-securing fasteners extending through the second cutout, (c) a third one of the bundles of electrical wires can be secured to the body adjacent where the second side segment extends from the closed-end segment by a third one of the plurality of wire-securing fasteners extending through the third cutout, and (d) a fourth one of the bundles of electrical wires can be secured to the second side segment adjacent the respective mounting foot by a fourth one of the plurality of wire-securing fasteners extending through the fourth cutout, wherein the first, second, third, and fourth bundles of wires are separate from, and thus not touching, each other, wherein at least the second and third bundles of wires rest on the closed-end segment of the body and, thus are not compressed against the mounting surface, and wherein the plurality of cutouts each include two apertures that are defined in the two sidewalls, axially arranged, in alignment with each other, and spaced from the base of the channel such that the respective wire fastener can be routed through the respective aligned apertures unobstructed by the support rib protruding from the base of the channel.

13. The electrical-wire bracket of claim 12, wherein the U-shaped body includes the support rib protruding from the base of the channel and extending substantially throughout the length of the channel such that the U-shaped body has an E-shaped cross-section.

14. The electrical-wire bracket of claim 12, wherein the closed-end segment and the first and second side segments of the U-shaped body are each generally linear and transition corners where the first and second side segments extend from the closed-end segment are curved.

15. The electrical-wire bracket of claim 12, wherein the two mounting feet include substantially flat mounting surfaces, the U-shaped body and the mounting feet extend along a first plane, and the mounting surface extends along a second plane that is substantially perpendicular to the first plane.

16. The electrical-wire bracket of claim 12, wherein each of the two mounting feet including a mounting hole for receiving a respective bracket-mounting fastener therethrough to mount the bracket to the mounting surface.

* * * * *